United States Patent
Dery

(10) Patent No.: US 7,519,400 B2
(45) Date of Patent: Apr. 14, 2009

(54) MULTI-MODULATION REMOTE CONTROL COMMUNICATION SYSTEM

(75) Inventor: Normand Dery, Quebec (CA)

(73) Assignee: DEI Headquarters, Inc., Vista, CA (US)

( * ) Notice: Subject to any disclaimer, the term of this patent is extended or adjusted under 35 U.S.C. 154(b) by 480 days.

(21) Appl. No.: 11/140,623

(22) Filed: May 27, 2005

(65) Prior Publication Data

US 2007/0008087 A1   Jan. 11, 2007

(51) Int. Cl.
H04M 1/00 (2006.01)
(52) U.S. Cl. ............ 455/569.2; 455/575.9; 455/96; 455/152.1; 455/345; 340/426.5; 340/426.6
(58) Field of Classification Search .......... 455/569.2, 455/575.9, 96, 99, 152.1, 345, 550, 551, 455/553; 340/426.5, 426.6, 933
See application file for complete search history.

(56) References Cited

U.S. PATENT DOCUMENTS

| | | | |
|---|---|---|---|
| 2,465,925 A | 3/1949 | Purington | |
| 4,103,238 A | 7/1978 | Deming et al. | 325/141 |
| 4,229,741 A | 10/1980 | Groth, Jr. | 370/24 |
| 4,660,192 A | 4/1987 | Pomato, Sr. | 370/11 |
| 4,672,375 A | 6/1987 | Mochida et al. | 340/825.31 |
| 4,928,778 A | 5/1990 | Tin | 180/167 |
| 4,963,887 A | 10/1990 | Kawashima et al. | 342/44 |
| 4,996,525 A | 2/1991 | Becker, Jr. et al. | 340/825.31 |
| 5,054,569 A | 10/1991 | Scott et al. | 180/167 |
| 5,142,691 A | 8/1992 | Freeburg et al. | 455/38.2 |
| 5,303,259 A | 4/1994 | Loveall | 375/1 |
| 5,379,033 A | 1/1995 | Fujii et al. | 340/825.69 |
| 5,423,074 A | 6/1995 | Dent | 455/74 |
| 5,479,156 A | 12/1995 | Jones | 340/825.31 |
| 5,517,189 A | 5/1996 | Bachhuber et al. | 340/825.69 |
| 5,600,323 A | 2/1997 | Boschini | 341/173 |
| 5,673,017 A | 9/1997 | Dery et al. | 340/426 |
| 5,680,105 A | 10/1997 | Hedrick | 340/571 |
| 5,721,550 A | 2/1998 | Lopez | 341/176 |
| 5,874,785 A | 2/1999 | Liu | 307/10.5 |
| 5,937,065 A | 8/1999 | Simon et al. | 380/9 |
| 6,075,454 A * | 6/2000 | Yamasaki | 340/5.61 |
| 6,265,988 B1 | 7/2001 | LeMense et al. | 340/825.69 |

(Continued)

FOREIGN PATENT DOCUMENTS

CA   2174482   10/1997

(Continued)

*Primary Examiner*—Minh D Dao
(74) *Attorney, Agent, or Firm*—KC Bean, Esq.

(57) ABSTRACT

An AM/FM modulation scheme is presented for optimizing communications between a remote control device held by a user and a receiving unit installed in a vehicle. Historically, these systems communicated with amplitude modulated signals having good range but poor immunity to ambient random radio frequency noise. Frequency modulated systems provide improved immunity to noise however at the expense of range. The object of this invention is to use two or more modulation modes to combine their advantages. A scheme has been devised whereby circuitry capable of alternately operating in at least two modes is used. The same information is therefore transmitted using two or more modulation techniques in succession. The receiving unit also has circuitry and has listening cycles ensuring eventual synchronization with the transmitting unit. If one mode fails due to distance or ambient noise, the other can then attempt to establish a link.

24 Claims, 7 Drawing Sheets

U.S. PATENT DOCUMENTS

| | | | |
|---|---|---|---|
| 6,285,296 B1 | 9/2001 | Christie | 340/825.69 |
| 6,292,107 B1 | 9/2001 | Yamaura et al. | 340/825.69 |
| 6,317,035 B1 | 11/2001 | Berberich et al. | 340/426 |
| 6,335,679 B1 | 1/2002 | Thomas et al. | 340/426 |
| 6,384,710 B1 | 5/2002 | LeMense et al. | 340/5.62 |
| 6,396,412 B1 | 5/2002 | Banas | 340/825.31 |
| 6,452,483 B2 | 9/2002 | Chen et al. | 340/425.5 |
| 6,452,484 B1 | 9/2002 | Drori | 340/426 |
| 6,472,998 B1 | 10/2002 | Lassle et al. | 340/825.69 |
| 6,512,462 B1 | 1/2003 | Robineau | 340/825.72 |
| 6,573,838 B2 | 6/2003 | Christie | 340/825.69 |
| 6,587,052 B1 | 7/2003 | Flick | 340/825.69 |
| 6,608,567 B2 | 8/2003 | Matsumoto | 340/905 |
| 6,636,171 B2 | 10/2003 | Chang | 341/173 |
| 6,650,236 B2 * | 11/2003 | Ghabra et al. | 340/447 |
| 6,703,921 B1 | 3/2004 | Wuidart et al. | 340/10.4 |
| 2001/0038328 A1 | 11/2001 | King et al. | 340/5.64 |
| 2002/0063634 A1 | 5/2002 | Bredow et al. | 340/825.69 |
| 2002/0098813 A1 | 7/2002 | Likourezos et al. | 455/93 |
| 2002/0187753 A1 | 12/2002 | Kim et al. | 455/69 |
| 2003/0025611 A1 | 2/2003 | Lin | 340/59 |
| 2003/0058083 A1 | 3/2003 | Birchfield | 340/59 |
| 2003/0189482 A1 | 10/2003 | Arshad et al. | 340/59 |
| 2003/0236071 A1 | 12/2003 | Ito | 455/59 |
| 2004/0036625 A1 | 2/2004 | Omata et al. | 340/825.69 |
| 2004/0037365 A1 | 2/2004 | King et al. | 375/268 |
| 2004/0049325 A1 * | 3/2004 | Flick et al. | 701/2 |
| 2004/0090315 A1 | 5/2004 | Mackjust et al. | 340/426.13 |
| 2004/0196141 A1 * | 10/2004 | Yoshida et al. | 340/5.63 |

FOREIGN PATENT DOCUMENTS

| | | |
|---|---|---|
| GB | 2 119 141 A | 11/1983 |
| GB | 2 161 344 A | 1/1986 |
| GB | 2 311 155 A | 9/1997 |
| WO | 00/20712 | 4/2000 |

* cited by examiner

MULTI-MODULATION REMOTE CONTROL COMMUNICATION SYSTEM

PRIORITY CLAIM UNDER 35 U.S.C. §119

This application claims priority to Canadian Patent Application No. 2,505,890 filed Apr. 29, 2005, Entitled: MULTI-MODULATION REMOTE CONTROL COMMUNICATION SYSTEM, the contents of which are incorporated herein by reference thereto.

TECHNICAL FIELD

This invention relates in general to a multi-modulation remote control communication system and more particularly to an AM/FM remote control communication system for range optimization of remote control systems including for vehicle applications.

BACKGROUND OF THE INVENTION

Radio frequency remote control systems are used in a number of vehicle applications, such as various combinations of convenience and security systems. For example, remote starter and security systems feature a transmitter carried by a user and a receiver mounted in the vehicle to receive the transmitted signal in order to remotely start the vehicle. The skilled person will appreciate that some of the combinations of vehicle applications to be remotely controlled, while not exhaustively listed, could comprise for example a convenience system alone, a security system alone, or a combined convenience and security system.

Historically the radio frequency remote control systems have been using amplitude modulation (AM) schemes due to their lower manufacturing costs, compactness, and ease of implementation.

Radio frequency remote control systems for vehicle applications may have unidirectional or bidirectional communications capability. In a unidirectional system, the user can send wireless signals to the vehicle. In a bidirectional system, the user can send wireless signals to the vehicle, and the vehicle can respond with for example feedback signals to indicate changes of state in the vehicle's security status, or a confirmation that a particular command has been carried out. In a bidirectional system the vehicle can autonomously send signals to the user, for example to warn the user that the vehicle is being tampered with.

In a vehicle environment there are many potential sources of electrical interference (RF noise). The sources of RF noise can be from the vehicle itself or from external sources, especially in an urban environment. Furthermore, the characteristics of on-vehicle RF noise may change during the service life of a particular vehicle. For example, the electric motor that drives the heater blower emits electrical interference at a certain frequency in a new vehicle. As the blower ages and wears, the frequency of the electrical interference may change, thus placing an additional technical challenge on the remote control system to provide the expected range.

RF noise will reduce the range of an AM remote control system because the signal is encoded in the amplitude. The RF noise tends to affect the amplitude of an AM signal and will therefore change the information being carried, resulting in "interference". So, while many radio frequency remote control systems for vehicle applications have been designed using AM receivers and transmitters, the AM solution is less resistant to interference.

Prior art remote control communications devices have been devised to attempt to address the problems cited above but the disadvantages remain.

For example, US2004/0037365: Remote transmitter system and method. An AM carrier signal of selectable frequency is applied, but still an AM signal with attendant drawbacks.

U.S. Pat. No. 4,660,192: Simultaneous AM and FM transmitter and receiver. This patent teaches simultaneous modulation of a carrier in AM and FM.

FM is more resistant to RF noise, however requires a more complex oscillator and receiver design. The reason why an FM signal is less affected by RF noise is because the FM signal has constant amplitude but varying frequency. The data is encoded by varying the frequency and thus RF noise does not affect FM as much.

It is an object of the present invention to provide a wireless remote control system with improved range and resistance to RF noise, for vehicle applications. Furthermore, the same solution could be applied to equivalent wireless remote control systems, regardless of the application, for stationary as well as mobile systems.

It is a further object of the present invention to carry out mode optimization when data is exchanged between a remote and a mobile.

It is another object of the present invention to carry out mode synchronization so a remote control system is continuously ready for service.

It is yet another object of the present invention to notify the user if the remote unit is out of range of the mobile unit.

SUMMARY OF THE INVENTION

In carrying out the above objects, a radio frequency multiple-modulation remote control system for vehicle applications is provided. The system comprises a remote unit for carrying by the user and a mobile unit for mounting on a vehicle. The remote unit comprises controllable RF circuitry such as transceiver, receiver, transmitter, and the like, as well as control circuitry such as a microprocessor, microcontroller, or other baseband processor circuitry. The mobile unit comprises controllable RF circuitry such as transceiver, receiver, transmitter, and the like, as well as control circuitry such as a microprocessor, microcontroller, or other baseband processor circuitry, and furthermore links to a vehicle application controller for the vehicle applications. The remote circuitry is operative to transmit a communications signal at a plurality of different radio modulation modes and to select a modulation mode for transmission. The mobile circuitry is operative to receive a communications signal from the remote unit. The remote circuitry is also configured to sequentially scan for a communications signal in two or more radio modulation modes. The mobile circuitry is further operative for a receive state, wherein the mobile will select a modulation mode from the remote that provides error-free transmission of data to the microprocessor, microcontroller, or other baseband processor circuitry. The mobile circuitry is further operative to send instructions to the remote transceiver to continue transmitting data in that particular modulation mode, until data is no longer being successfully received. At that point the mobile and remote would repeat the process to negotiate another modulation mode for data transmission.

In accordance with one aspect of the present invention there is provided a vehicle application wireless remote control communications system comprising: a remote unit comprising transceiver, receiver and/or transmission circuitry, for carrying by a user, the remote unit being operative to exchange data in a plurality of modulation modes and to select a modulation mode for such purpose, the remote unit further being operative to contain and transmit one or more user-selected vehicle application functions, the remote unit further being operative to receive and optionally indicate vehicle-selected vehicle application functions; a mobile unit comprising transceiver, receiver and/or transmission circuitry, for mounting on a vehicle and exchanging data with the remote unit, and operative to transmit and receive data in the plurality of modulation modes and to select a modulation mode for such purpose, the mobile unit further being operative to contain and transmit one or more vehicle-selected vehicle application functions; a means for the communications system to select the modulation mode from among the plurality of modulation modes for exchange of data between said remote and mobile units; and a means of optionally bidirectionally interfacing the mobile unit to a vehicle application controller so that the user-selected vehicle application function can be implemented whereby the user-selected vehicle application function is transmitted from said remote unit to said mobile unit by said selected modulation mode, wherein the user-selected vehicle application function is sent via the optionally bidirectional interface to the vehicle application controller for execution.

In accordance with another aspect of the present invention there is provided a vehicle application wireless remote control communications system comprising: a remote unit comprising transceiver, receiver and/or transmission circuitry, for carrying by a user, the remote unit being operative to transmit data in a plurality of modulation modes, the remote unit further being operative to contain and transmit one or more user-selected vehicle application functions; a mobile unit comprising transceiver, receiver and/or transmission circuitry, for mounting on a vehicle and receiving data from the remote transmitter, and operative to receive data in the plurality of modulation modes; a means for the communications system to select the modulation mode from among the plurality of modulation modes for receipt of data from said remote unit; and a means of optionally bidirectionally interfacing the mobile unit to a vehicle application controller so that the user-selected vehicle application function can be implemented whereby the user-selected vehicle application function is transmitted from said remote unit to said mobile unit by a selected mode from said plurality of modulation modes, wherein the user-selected vehicle application function is sent via the optionally bidirectional interface to the vehicle application controller for execution.

In accordance with yet another aspect of the present invention there is provided a vehicle application wireless remote control communications system comprising: a remote unit comprising transceiver, receiver and/or transmission circuitry, for carrying by a user, the remote unit being operative to exchange data in a plurality of modulation modes, the remote unit further being operative to contain and transmit one or more user-selected vehicle application functions, the remote unit further being operative to receive and optionally indicate vehicle-selected vehicle application functions; a mobile unit comprising transceiver, receiver and/or transmission circuitry, for mounting on a vehicle and exchanging data with the remote unit, and operative to transmit and receive data in the plurality of modulation modes, the mobile unit further being operative to contain and transmit one or more vehicle-selected vehicle application functions; the remote unit further being operative to determine the received signal strength of each of the modulation modes; the mobile unit further being operative to determine the received signal strength of each of the modulation modes; a means for the communications system to select the modulation modes having the highest received signal strengths from among the plurality of modulation modes for exchange of data between said remote and mobile units; and a means of optionally bidirectionally interfacing the mobile unit to a vehicle application controller so that the user-selected vehicle application function can be implemented whereby the user-selected vehicle application function is transmitted from said remote unit to said mobile unit by said plurality of modulation modes, wherein the user-selected vehicle application function is sent via the optionally bidirectional interface to the vehicle application controller for execution.

In accordance with yet another aspect of the present invention there is provided a wireless remote control communications system comprising: a first communication means for exchanging data in a plurality of modulation modes; a second communication means for exchanging data in a plurality of modulation modes; a first signal-processing means operatively coupled to the said first communications means, the first signal-processing means programmed to perform the following functions: a) contain and transmit one or more application functions; b) receive and analyse signals indicative of criteria for modulation selection; c) receive and indicate one or more application functions originating from a second signal-processing means; and d) select the modulation mode from among the plurality of modulation modes based on the criteria for modulation selection; a second signal-processing means operatively coupled to the second communications means and interfaced with an application controller, the second signal-processing means programmed to perform the following functions: a) contain and transmit one or more application functions; b) receive and analyse signals indicative of criteria for modulation selection; c) receive and implement one or more application functions originating from the first signal-processing means by sending a command signal to the application controller; and d) select the modulation mode from among the plurality of modulation modes based on the criteria for modulation selection.

In accordance with one method aspect of the present invention there is provided a method for operating a vehicle application wireless remote control communications system comprising a remote unit comprising transceiver, receiver and/or transmission circuitry, for carrying by a user, the remote unit being operative to exchange data in a plurality of modulation modes, the remote unit further being operative to contain and transmit one or more user-selected vehicle application functions, the remote unit further being operative to receive and optionally indicate vehicle-selected vehicle application functions, and a mobile unit comprising transceiver, receiver and/or transmission circuitry, for mounting on a vehicle and exchanging data with the remote unit, the mobile unit being operative to transmit and receive data in the plurality of modulation modes, the mobile unit further being operative to contain and transmit one or more vehicle-selected vehicle application functions, and a means for the communications system to select the modulation mode from among the plurality of modulation modes for exchange of data between said remote and mobile units, and a means of optionally bidirectionally interfacing the mobile unit to a vehicle application controller so that the user-selected vehicle application function can be implemented whereby the user-selected vehicle application function is transmitted from said remote unit to said mobile unit by said selected modulation mode, wherein the user-selected vehicle application function is sent via the optionally bidirectional interface to the vehicle application controller for execution, the method comprising the steps of: exchanging data between the remote unit and the mobile unit in one or more of the plurality of modulation modes; selecting the modulation mode from among the plurality of modulation modes; transmitting the user-selected vehicle application function from said remote unit to said mobile unit by said selected modulation mode; and interfacing the mobile unit to a vehicle application controller so that the user-selected vehicle application function is implemented.

In accordance with another method aspect of the present invention there is provided a method for operating a vehicle application wireless remote control communications system comprising a remote unit comprising transceiver, receiver and/or transmission circuitry, for carrying by a user, the remote unit being operative to exchange data in a plurality of modulation modes, the remote unit further being operative to contain and transmit one or more user-selected vehicle application functions, the remote unit further being operative to receive and optionally indicate vehicle-selected vehicle application functions, and a mobile unit for mounting on a vehicle and exchanging data with the remote, the mobile unit being operative to transmit and receive data in the plurality of modulation modes, the mobile unit further being operative to contain and transmit one or more vehicle-selected vehicle application functions, and a means for the communications system to select the modulation mode from among the plurality of modulation modes for exchange of data between said remote and mobile units, and a means of optionally bidirectionally interfacing the mobile unit to a vehicle application controller so that the user-selected vehicle application function can be implemented whereby the user-selected vehicle application function is transmitted from said remote unit to said mobile unit by said selected modulation mode, wherein the user-selected vehicle application function is sent via the optionally bidirectional interface to the vehicle application controller for execution, the method comprising the steps of: transmitting the user-selected vehicle application function from the remote unit to the mobile unit in the plurality of modulation modes; selecting the modulation mode from among the plurality of modulation modes; receiving the user-selected vehicle application function at said mobile unit in said selected modulation mode; and interfacing the mobile unit to a vehicle application controller so that the user-selected vehicle application function is implemented.

In a preferred embodiment, the modulation modes are on-off keying (OOK), amplitude shift keying (ASK) and frequency shift keying (FSK), and digital data is modulated onto an RF carrier using these modulation modes to produce the communications signals.

Conveniently, the present invention carries out mode synchronization on a periodic basis.

Preferably, the user is notified if the remote transceiver is out of range of the mobile.

In another embodiment of the invention the invention is implemented in a unidirectional system. A remote transmitter transmits AM data as well as FM data. The mobile receiver will scan both AM and FM, and will receive the data in the modulation type that provides the best reception.

These and other objects of the present invention will be more readily described by reference to the accompanying drawings.

BRIEF DESCRIPTION OF THE DRAWINGS

An embodiment of the invention will now be described by way of example only with reference to the accompanying drawings, in which like numbers refer to like elements. The drawings are.

DETAILED DESCRIPTION OF EXEMPLARY EMBODIMENTS

Figure 1:
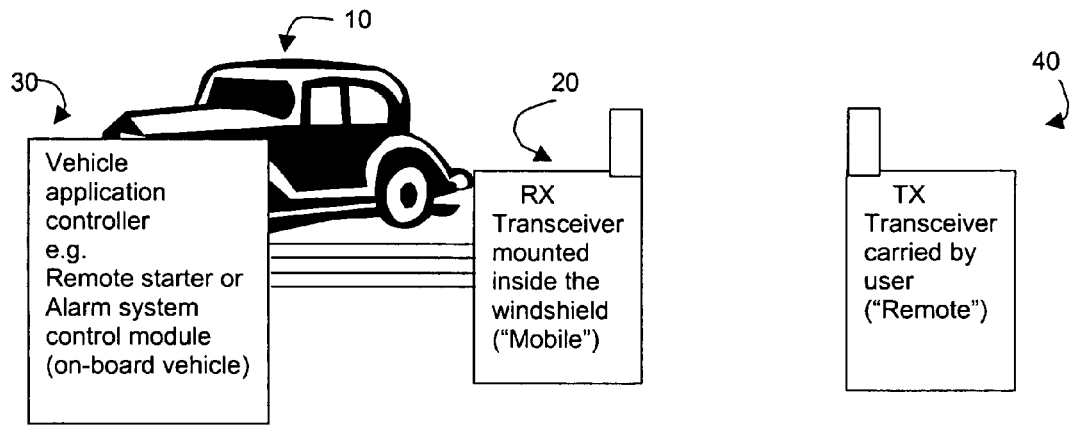
FIG. 1, in a block diagram, illustrates a basic remote starter system for vehicles in accordance with the preferred embodiment of the present invention.

Referring now to FIG. 1, a radio frequency multiple-modulation remote control system for vehicle applications of the present invention comprises a remote unit (TX) 40 for carrying by a user and a mobile unit (RX) 20 for mounting on a vehicle 10. Through a vehicle application controller 30, the RX interfaces with the on-board systems that are to be controlled by the TX.

Figure 2:
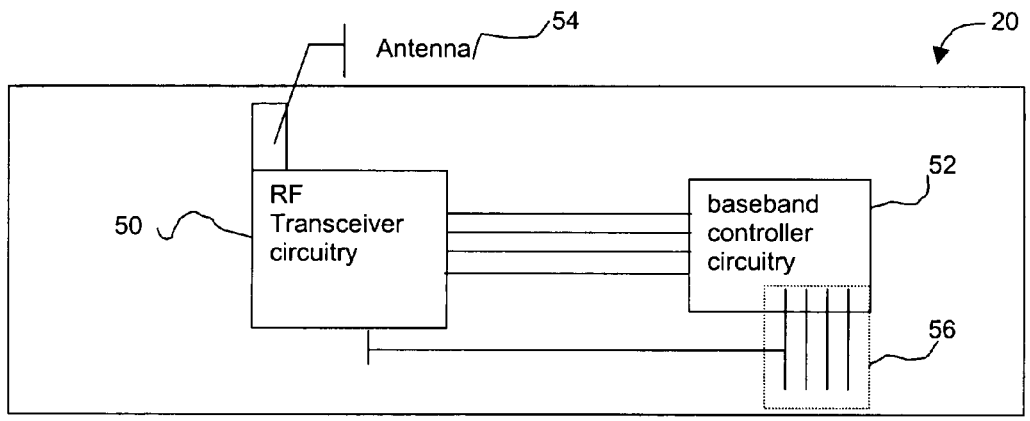
FIG. 2, in a block diagram, illustrates the mobile transceiver of FIG. 1.
Figure 3:
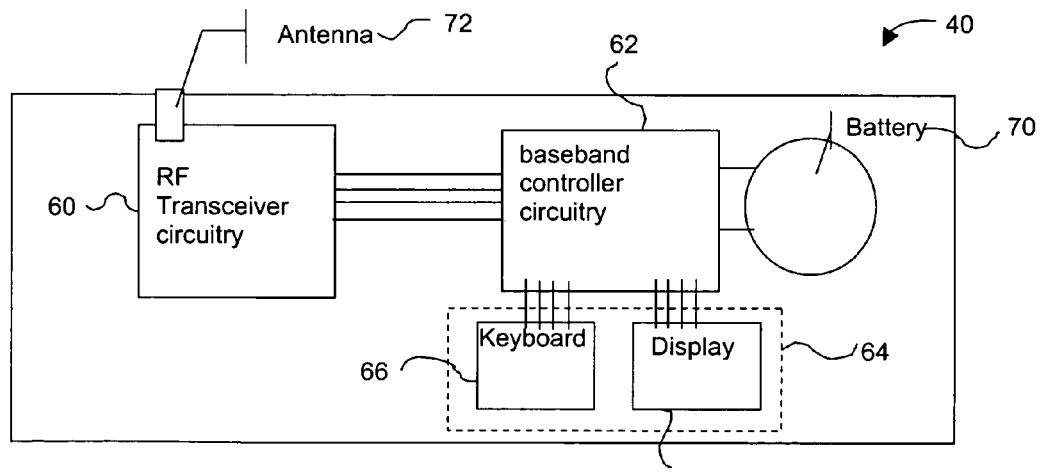
FIG. 3, in a block diagram, illustrates the remote transceiver of FIG. 1.

Referring to FIGS. 2 and 3 the RX and the TX comprise an RF transceiver circuit 50 and 60 controlled by baseband processor circuitry 52 and 62. The term "baseband processor circuitry" is intended to indicate the use of circuitry such as a microprocessor, a microcontroller, or an application-specific integrated circuit. The baseband processor circuitry has at least the following functionality: it controls the RF transceiver circuitry, decodes and encodes data, and operates a control program which includes the vehicle operating functions and instructions for multiple modulation mode operation, selection and data exchange. For use in both the RX and the TX, a transceiver circuit TRF6903 manufactured by Texas Instruments has been found satisfactory, as has the TH7122 by Melexis, the XE1202 by XEMICS, the CC1000 by Chipcon, and the AT86RF211 by Atmel. The skilled person will appreciate that other circuitry will be satisfactory for use in the RX and the TX. The term "transceiver" is used to represent circuitry capable of transmitting as well as receiving. It is further understood that whenever the capability to transmit and receive is indicated by the use of the term "transceiver", any circuitry or collection of circuitries that have these capabilities can be used to practice the invention. All devices or collections of devices that are able to receive and/or transmit either successively or simultaneously can be used to practice the invention and are understood to be represented by the term "transceiver". All devices or collections of devices that, as a subset of their capabilities, are able to receive and/or transmit either successively or simultaneously can be used to practice the invention and are understood to be represented by the term "transceiver".

Describing now the RX in more detail, FIG. 2 depicts the RF transceiver circuitry 50, the baseband processor circuitry 52, an antenna 54 and the interface 56 to the vehicle application controller 30. The RX transceiver circuitry 50 may be reconfigured under the control of the baseband processor circuitry 52 to function in the required AM or FM mode. The skilled person will appreciate that the mobile 20 could be integrated with the vehicle application controller 30 and still be within the scope and spirit of the present invention.

Referring now to FIG. 3 the TX 40 is operative to transmit data to and receive data from the mobile transceiver RX unit 20. The TX 40 comprises RF transceiver circuitry 60 controlled by the baseband processor circuitry 62, a user interface 64 which for example may include a keyboard 66 and display 68, an antenna 72 and a battery 70. Upon receiving the appropriate selection signal from the baseband processor circuitry 62, the transceiver circuitry 60 will function in the required AM or FM mode.

As aforesaid, both the TX and the RX have the capability to communicate in AM or FM modes. They will change the active mode in the transceiver chip upon receipt of a signal from the baseband processor circuitry. Variants of the AM modes can be amplitude shift keying (ASK) and on-off keying (OOK). The FM mode can be frequency shift keying (FSK). The RX and TX transceivers also comprise received signal strength indicator (RSSI) circuitry.

The skilled person will appreciate that other arrangements of circuitry can be used to obtain multiple modulation mode capability. For example, by selectively controlling a single-mode transceiver, emulated output signals can be obtained that have the characteristics of additional modulation modes. Thus the skilled person will appreciate that ASK, OOK and FSK signals can be prepared, transmitted, received and processed by numerous arrangements of circuitry, and the resulting plurality of modulation modes are within the spirit and scope of the invention, whether one or more of the modulation modes are obtained in an emulated manner or not. The terminology "a plurality of modulation modes" is thus understood to comprise emulated modulation modes as well.

Figure 4:
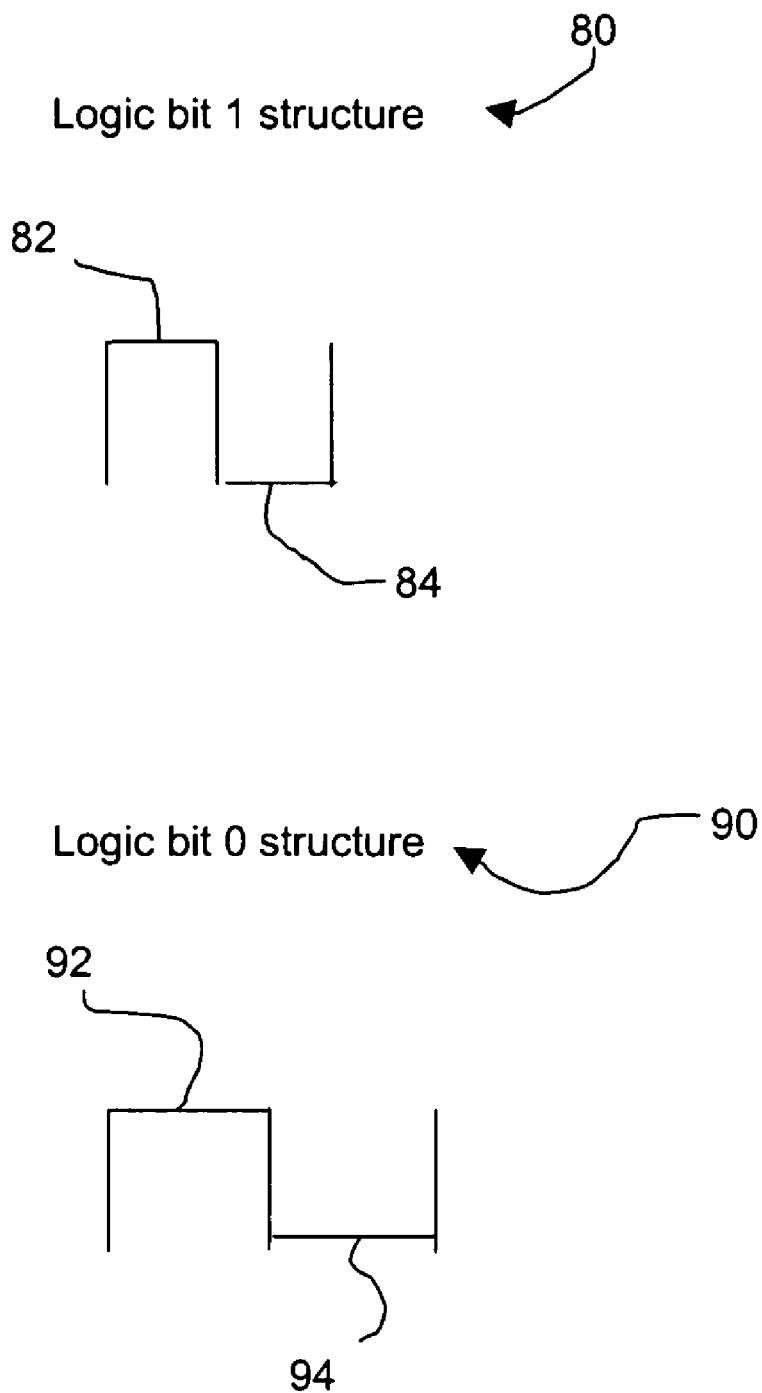
FIG. 4, in a diagram, illustrates the basic data element.

Prior to describing the process to establish data communications, the data structure will be described. FIG. 4 illustrates an example of a fundamental structure of the basic data element, a logical data bit. Each logical data bit 80 or 90, when transmitted, is a set of two tones or periods, a high state 82 or 92 followed by a low state 84 or 94. The logical 1 bit 80 is distinguished from the logical 0 bit 90 by the length of the tones or periods. Thus the period for a logical 1 bit 80 can be for example in a range from 50 milliseconds to 1 millisecond, while the period for the logical 0 bit 90 would be 50% longer. The skilled person will appreciate that other fundamental data bit structures and time periods will be satisfactory for use in the invention.

Figure 5:
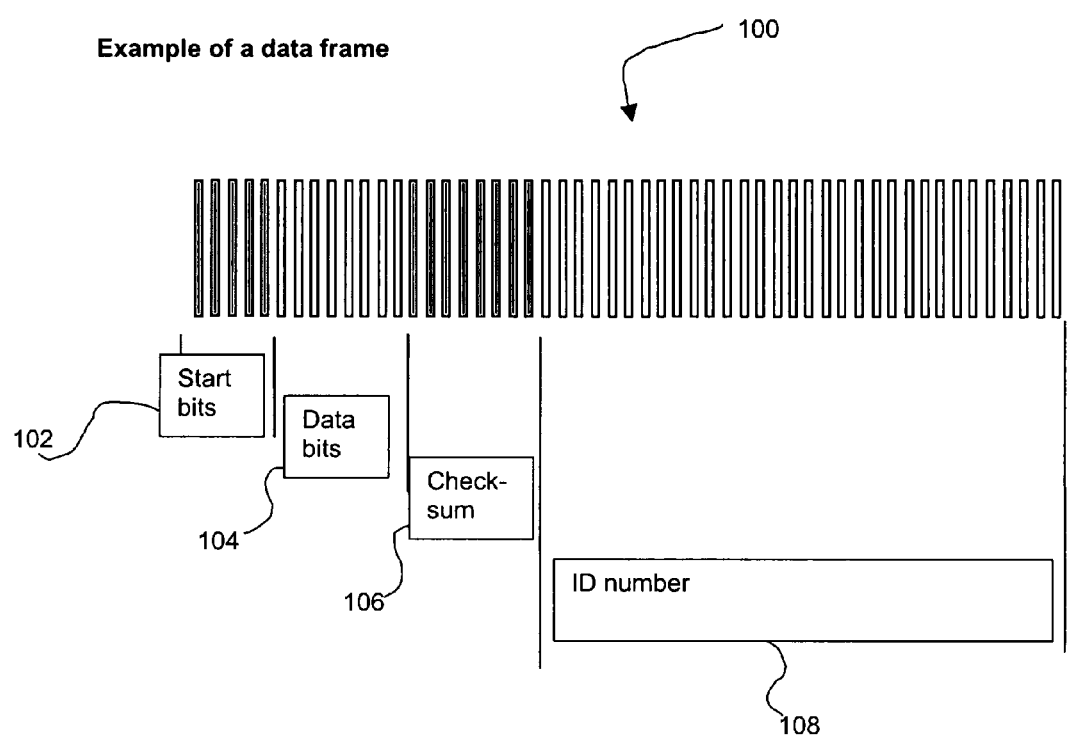
FIG. 5, in a diagram, illustrates the general data structure.

The logical data bits are grouped into data frames, which form the general data structure. FIG. 5 illustrates an example of a general structure of a data frame 100. Thus, when a frame 100 is transmitted, a certain number of bits representing one piece of information are transmitted. In one embodiment, a frame contains approximately 50 bits. Generally, a frame comprises a set of start bits 102, a set of data bits or commands 104, a set of checksum bits 106, and a set of bits representing a device identification number 108. The skilled person will appreciate that other data frame structures will be satisfactory for use in the invention.

In order to carry out a vehicle application function, the user initiates a command using the keyboard 66 of the remote unit (TX) 40. The signal from the keyboard 66 is picked up by the baseband processor circuitry 62 at an appropriate input, which then initiates a communications algorithm, which is contained in the control program. The purpose of the communications algorithm is to enable the transmission of a collection of logical data bits (a frame) representing the desired function of the keyboard selection. The RX is programmed to wait for commands from the TX. The default state of the RX is a continuous receive mode. Since the RX is vehicle-mounted, the vehicle's on-board electrical system will provide adequate power to allow the RX to remain in continuous receive mode.

On initiating data communications between the remote and the mobile, the data frames will be repeatedly transmitted sufficiently often to facilitate reception by the remote, ensuring that the transmit and receive cycles converge sufficiently quickly to permit timely activation of the user-selected command, while making appropriate use of system resources such as battery capacity. It will be appreciated that all processes described herein as being initiated by the remote to establish communications and mode synchronization with the mobile can analogously be initiated by the mobile in order to establish communications with the remote. For example, an alarm signal can be generated by the vehicle application controller for autonomous transmission back to the user, to warn the user that the vehicle is being tampered with.

When initiating data communications using a bidirectional system, if the user is too far away from the RX, or environmental conditions are such that data communications cannot take place, the TX, having completed the data transmission without receiving a confirmation signal will indicate to the user that data communications could not be established.

Figure 6:
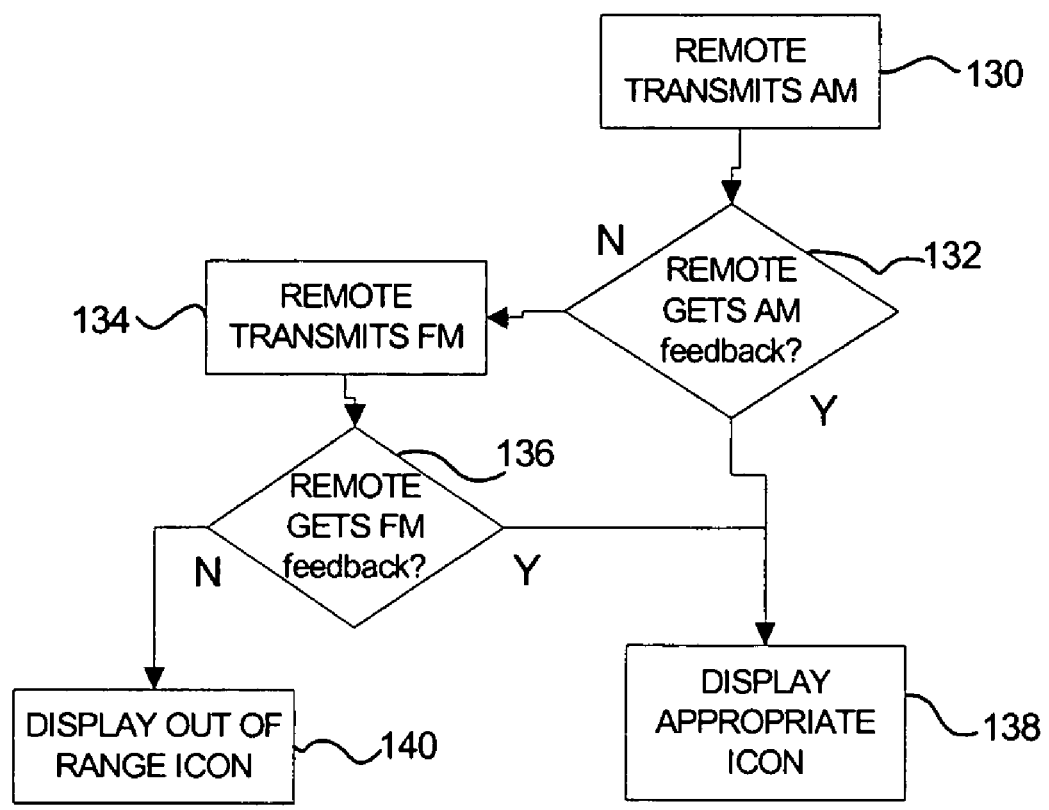
FIG. 6, in a flow chart, illustrates an AM-default AM/FM modulation scheme.

FIG. 6 illustrates an embodiment of the method of the present invention using an AM default scheme to accomplish dual-mode data communications. In this embodiment, the mobile is programmed to continuously scan for data transmissions from the remote. The scanning is done alternately in AM and FM. The mobile is programmed to return a feedback message in the same type of modulation it received. The remote transmits a sequence, with sufficient repetitions, of identical data frames representing a command in AM mode at block 130 and then is placed in receive mode by the baseband processor circuitry to wait for feedback from the mobile. If the remote gets AM feedback at block 132, then an appropriate icon is displayed at block 138, confirming that the mobile has received data communications representing a command and has carried it out. If after a time period the remote gets no AM feedback, the remote then transmits the data in FM at block 134 and listens for feedback from the mobile. The mobile has in the meantime been scanning alternately in AM and FM, and if range and RF noise conditions are appropriate the mobile will receive at least one of the AM commands sent by the remote. The mobile then transmits a confirmatory feedback command back to the remote. If the remote receives FM feedback from the mobile at block 136, then the appropriate icon is displayed at block 138, as a confirmation that the mobile has received data communications representing a command and has carried it out. If the remote does not receive an FM feedback signal from the remote at block 136, an out of range icon is displayed at block 140.

Figure 7:
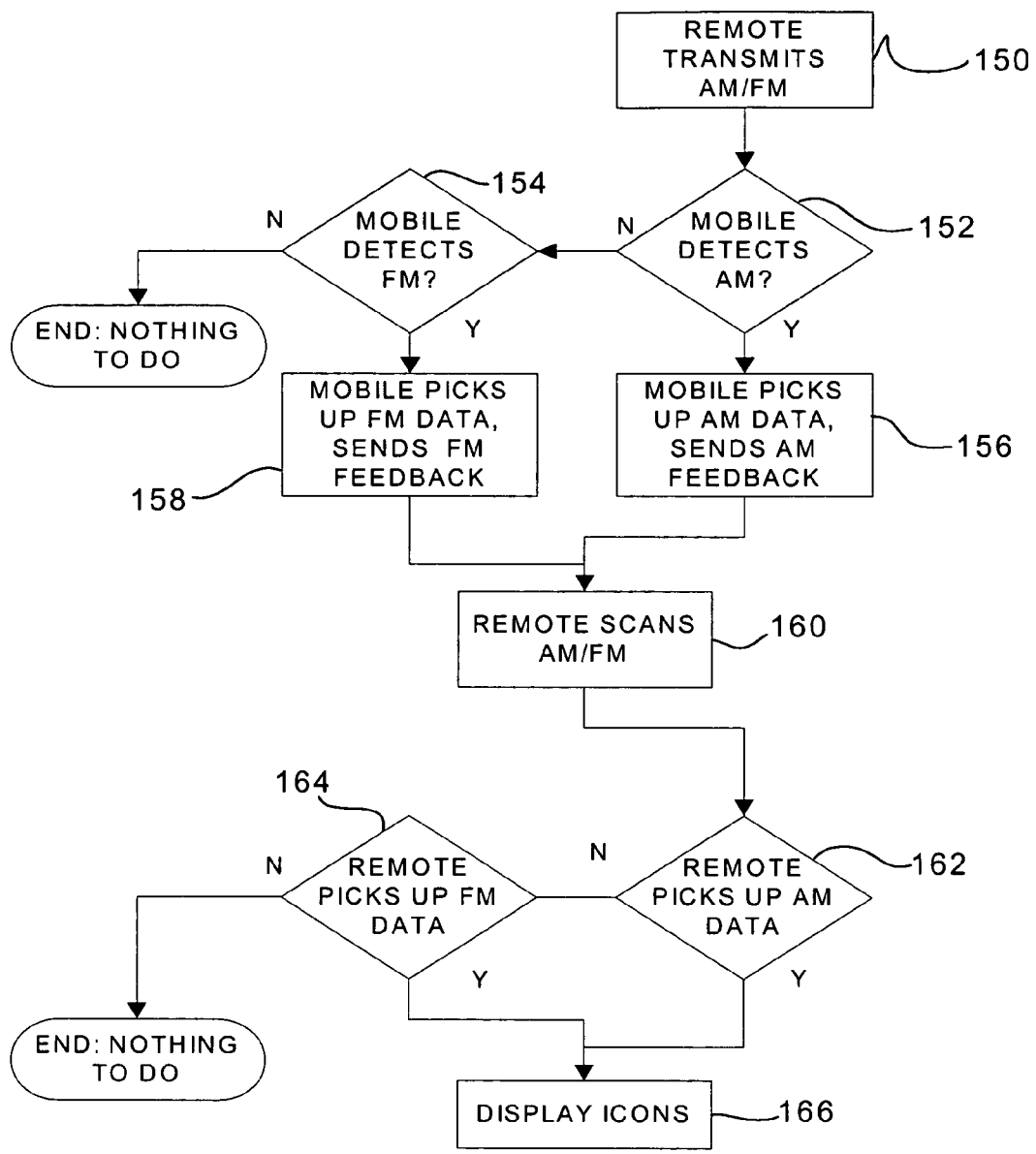
FIG. 7, in a flow chart, illustrates an AM/FM transmit AM/FM modulation scheme.

FIG. 7 illustrates an embodiment of the method of the present invention using an AM/FM scheme to accomplish data communications. The mobile in this embodiment is programmed to alternately scan AM and FM. The remote is actuated by the user and alternately transmits a sequence of AM and FM data frames at block 150. Once the remote has finished transmitting, it turns on the receiver and alternately scans AM and FM, awaiting data from the mobile at block 160. Meanwhile, if the mobile has received either AM at block 152 or FM data at block 154 from the remote, it will carry out the command contained in the data and will transmit the appropriate feedback to the remote at blocks 156 and 158, which upon receiving the AM or FM data respectively at blocks 162 and 164 will display the appropriate confirmation icon.

The previous two embodiments require data modulation synchronization every time a command has been sent from the remote to the mobile, or every time the mobile has sent a message to the remote. Embodiments wherein modulation synchronization is carried out periodically, to maintain the remote and mobile at a state of readiness for a given period of time, are also within the scope and spirit of the present invention.

Figure 8:
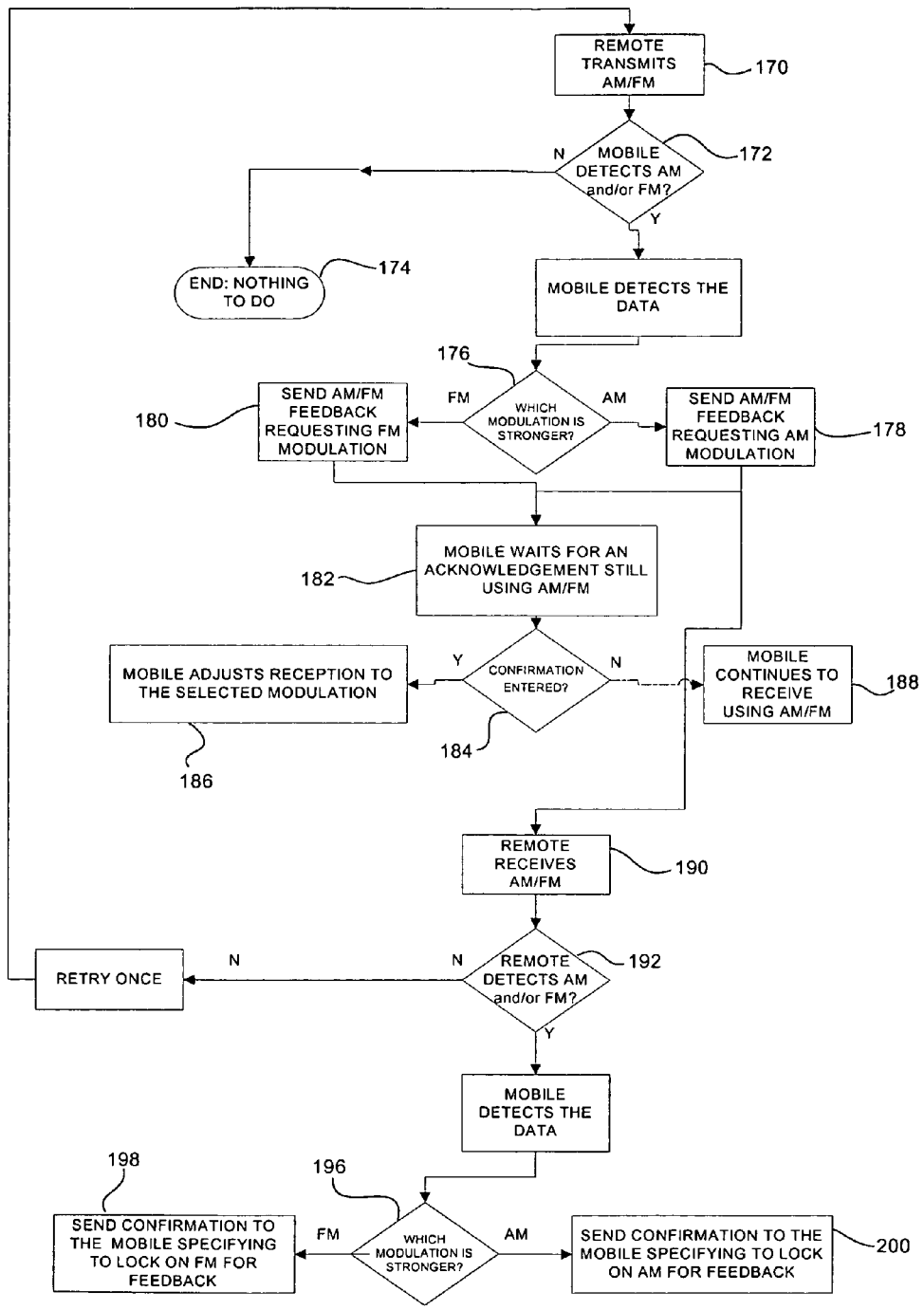
FIG. 8, in a flow chart, illustrates a signal-strength analysed AM/FM modulation scheme.

FIG. 8 illustrates an embodiment of a method of the present invention using a modulation synchronization request command. Using this method, the remote is programmed to transmit in one mode and receive feedback from the mobile in an alternate mode. The remote sends a modulation synchronization request command to the mobile at block 170. The transmit sequence alternately comprises AM and FM data frames representing the modulation synchronization request command. The remote transmits the same modulation synchronization request command data frame with sufficient repetitions to ensure reception by the mobile if range and RF noise conditions are acceptable. The mobile by default alternately scans for AM and FM signals. If the mobile detects either AM or FM data or both at block 172, the mobile tests the signal-strength of the detected data at block 176 by using the RSSI circuitry and then transmits an AM/FM feedback requesting either AM or FM modulation, whichever has the stronger signal, from the remote at blocks 178 and 180, respectively. The mobile then switches to receive mode at block 182 and waits for a mode confirmation from the TX; the mobile alternately scans for AM and FM signals. If at block 184 the mobile has obtained confirmation from the remote, then the mobile's microprocessor will set the mobile to receive in that particular modulation at block 186. However, if confirmation has not been received, the mobile at block 188 will continue to wait for confirmation by operating the receiver alternately in AM and FM.

Continuing to refer to FIG. 8, having transmitted data to the mobile, the remote tests for feedback from the mobile at block 190, by alternately being set to receive in AM and FM. On detecting data from the mobile at block 192, the remote will test the strength of the signals at block 196 using the RSSI circuitry and will be set to receive whichever modulation is stronger. The mobile will be sent a confirmation, from either of blocks 198 or 200, notifying it which modulation the remote will continue to use for the duration of the synchronization period, in order to receive feedback signals from the mobile. By using the method of FIG. 10, the remote and the mobile can be synchronized to transmit and receive in different modulation modes, in order to have improved range for the remote and the mobile. For example, the remote could transmit in AM but receive feedback from the mobile in FM. The mobile would set to receive and transmit accordingly.

In yet another embodiment of the method of the present invention using a modulation synchronization request command, the modulation types to be used by the remote and the mobile are selected manually by the user. The manual synchronization is implemented by sending an AM communication command from the remote transceiver to the mobile transceiver to test the communication. On receiving a feedback signal the remote will indicate the AM signal strength to the user. If the AM signal strength is insufficient, the user can then select FM modulation on the TX.

Figure 9:
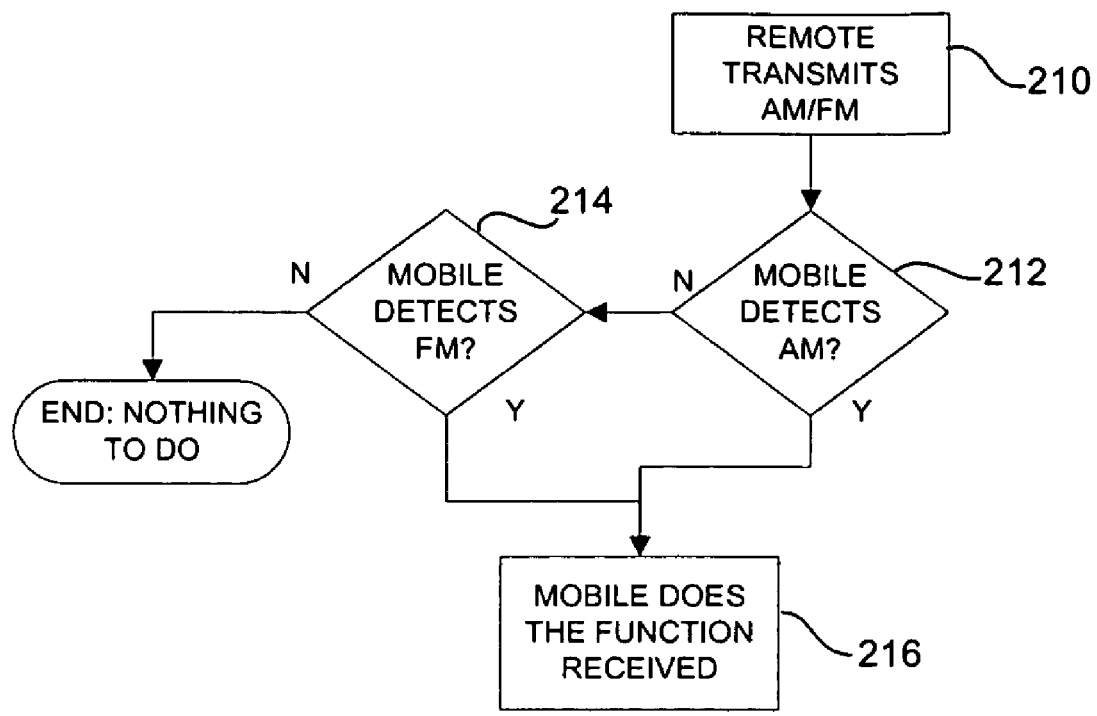
FIG. 9, in a flow chart, illustrates a unidirectional AM/FM modulation scheme.

FIG. 9 illustrates another embodiment of the method of the present invention, AM/FM modulation for a unidirectional system. In such a unidirectional system, the TX comprises a transmitter instead of a transceiver, and the RX is equipped with a receiver instead of a transceiver. Thus the TX can transmit to the RX, which can receive, at block 210; the TX cannot receive, and the RX cannot transmit. The TX will transmit both AM and FM data. The mobile RX receiver will scan both modulation types at blocks 212 and 214 and pick up the data in the mode that provides the best reception, wherein it will execute the function command that it has received (block 216).

An embodiment of the present invention is used to solve a range and interference problem for a general wireless remote control communication system, which may for example be an industrial stationary application such as a remote gate control, or an industrial mobile application such as the remote control of a warehouse trolley. If a wireless remote control system as applied to any of such general remote control systems has reception problems such as limited range or apparent susceptibility to interference, those skilled in the art will understand that any of the solutions described above are appropriate to solve such reception problems, while remaining within the spirit and scope of the present invention.

While the present invention has been described with reference to one or more preferred embodiments, those skilled in the art will recognize that many changes may be made thereto without departing from the spirit and scope of the present invention which is set forth in the following claims.

What is claimed is:

1. A vehicle application wireless remote control communications system comprising:
   a remote unit comprising a receiver and transmission circuitry, for carrying by a user, the remote unit being operative to exchange data in a plurality of modulation modes, the remote unit further being operative to contain and transmit a representation of a user-selected vehicle application function, the remote unit further being operative to receive representations of vehicle-selected vehicle application functions;
   a mobile unit comprising a receiver and transmission circuitry, for mounting on a vehicle and exchanging data with the remote unit, and operative to transmit and receive data in the plurality of modulation modes, the mobile unit further being operative to contain and transmit one or more of the representations of the vehicle-selected vehicle application functions;
   a means for the communications system to select a selected modulation mode from among the plurality of modulation modes for exchange of data between said remote and mobile units; and
   an interface from the mobile unit to a vehicle application controller so that the user-selected vehicle application function is implemented whereby the representation of the user-selected vehicle application function is transmitted from said remote unit to said mobile unit by said selected modulation mode, wherein, in response to receiving at the mobile unit the representation of the user-selected vehicle application function transmitted by the selected modulation mode from the remote unit, a signal corresponding to the user-selected vehicle application function is sent from the mobile unit via the interface to the vehicle application controller for execution.

2. The system of claim 1 wherein the plurality of modulation modes comprises amplitude modulation mode and a frequency modulation mode.

3. The system of claim 2 wherein the amplitude modulation mode comprises an amplitude-shift keying mode or an on-off keying mode.

4. The system of claim 2 wherein the frequency modulation mode comprises a frequency-shift keying mode.

5. The system of claim 4 wherein the means for the communications system to select is configured to select so that the selected modulation mode provides an error-free signal.

6. The system of claim 2 wherein the means for the communications system to select is configured to select a modulation mode automatically every time one unit selected from the mobile unit and the remote unit sends a command to the other unit selected from the mobile unit and the remote unit.

7. The system of claim 2 wherein the means for the communications system to select is configured to periodically negotiate the selected mode between the remote unit and the mobile unit.

8. The vehicle application wireless remote control communications system of claim 1, further comprising the vehicle application controller, wherein the interface is bidirectional, whereby the vehicle application controller is further operative to invoke the vehicle-selected vehicle application functions by sending a selection signal to the mobile unit.

9. The system of claim 8 wherein the means for the communications system to select is configured to select a modulation mode is automatically every time one unit selected from the mobile unit and the remote unit sends a command to the other unit selected from the mobile unit and the remote unit.

10. The system of claim 8 wherein the means for the communications system to select is configured to periodically negotiate the selected mode between the remote unit and the mobile unit.

11. The system of claim 1 wherein the means for the communications system to select is configured to select a modulation mode automatically every time one unit selected from the mobile unit and the remote unit sends a command to the other unit selected from the mobile unit and the remote unit.

12. The system of claim 1 wherein the means for the communications system to select is configured to select so that the selected modulation mode provides a strongest signal.

13. The system of claim 1 wherein the means for the communications system to select is configured to periodically negotiate the selected mode between the remote unit and the mobile unit.

14. A vehicle application wireless remote control communications system comprising:
   a remote unit comprising a receiver and transmission circuitry, for carrying by a user, the remote unit being operative to transmit data in a plurality of modulation modes, the remote unit further being operative to contain and transmit a representation of a user-selected vehicle application function;
   a mobile unit comprising a receiver and transmission circuitry, for mounting on a vehicle and receiving data from the remote unit in the plurality of modulation modes;
   a means for the communications system to select a selected modulation mode from among the plurality of modulation modes for receipt of data from said remote unit; and
   an interface from the mobile unit to a vehicle application controller so that the user-selected vehicle application function is implemented whereby the representation of the user-selected vehicle application function is transmitted from said remote unit to said mobile unit by said selected modulation mode, wherein, in response to receiving at the mobile unit the representation of the user-selected vehicle application function transmitted by the selected modulation mode from the remote unit, a signal corresponding to the user-selected vehicle application function is sent from the mobile unit via the interface to the vehicle application controller for execution.

15. A vehicle application wireless remote control communications system comprising:
   a remote unit comprising a receiver and transmission circuitry, for carrying by a user, the remote unit being operative to exchange data in each modulation mode of a plurality of modulation modes, the remote unit further being operative to contain and transmit a representation of a user-selected vehicle application function, the remote unit further being operative to receive vehicle-selected vehicle application functions;
   a mobile unit comprising a receiver and transmission circuitry, for mounting on a vehicle and exchanging data with the remote unit, and operative to transmit and receive data in said each modulation mode of the plurality of modulation modes, the mobile unit further being operative to contain and transmit one or more of the vehicle-selected vehicle application functions;
   the remote unit further being operative to determine received signal strength of each of the modulation modes transmitted by the mobile unit, and the mobile unit further being operative to determine received signal strength of each of the modulation modes transmitted by the remote unit;
   a means for the communications system to select the a selected modulation mode from the plurality of modulation modes for communication from the remote unit to the mobile unit, the selected modulation mode having the highest received signal strengths from among the plurality of modulation modes for transmission of data from said remote unit to said mobile unit; and
   an interface from the mobile unit to a vehicle application controller so that the user-selected vehicle application function is implemented whereby the representation of the user-selected vehicle application function is transmitted from said remote unit to said mobile unit by said selected modulation mode, wherein, in response to receiving at the mobile unit the representation of the user-selected vehicle application function transmitted by the selected modulation mode from the remote unit, a signal corresponding to the user-selected vehicle application function is sent from the mobile unit via the interface to the vehicle application controller for execution.

16. A method for operating a vehicle application wireless remote control communications system comprising a remote unit comprising a transceiver, for carrying by a user, the remote unit being operative to exchange data in a plurality of modulation modes, the remote unit further being operative to contain and transmit one or more representations of user-selected vehicle application functions, each representation of the one or more representations corresponding to a different user-selected function, the remote unit further being operative to receive and indicate vehicle-selected vehicle application functions, and a mobile unit comprising a transceiver, for mounting on a vehicle and exchanging data with the remote unit, the mobile unit being operative to transmit and receive data in the plurality of modulation modes, the mobile unit further being operative to contain and transmit the one or more vehicle-selected vehicle application functions, and a means for the communications system to select a selected modulation mode from among the plurality of modulation modes for exchange of data between said remote and mobile units, and an interface coupling the mobile unit to a vehicle application controller, the method comprising the steps of:
   exchanging data between the remote unit and the mobile unit in one or more of the plurality of modulation modes;

step for selecting the selected modulation mode from among the plurality of modulation modes, for sending data from the remote unit to the mobile unit;

transmitting a representation of a particular user-selected vehicle application function from said remote unit to said mobile unit by said selected modulation mode; and sending through the interface a command corresponding to the particular user-selected vehicle application function from the mobile unit to the vehicle application controller to cause the vehicle application controller to perform the user-selected vehicle application function.

17. A method for operating a vehicle application wireless remote control communications system comprising a remote unit comprising a transceiver, for carrying by a user, the remote unit being operative to exchange data in a plurality of modulation modes, the remote unit further being operative to contain and transmit one or more representations of user-selected vehicle application functions, each representation of the one or more representations corresponding to a different user-selected function, the remote unit further being operative to receive and indicate vehicle-selected vehicle application functions, and a mobile unit for mounting on a vehicle and exchanging data with the remote unit, the mobile unit being operative to transmit and receive data in the plurality of modulation modes, the mobile unit further being operative to contain and transmit the one or more vehicle-selected vehicle application functions, and a means for the communications system to select a selected modulation mode from among the plurality of modulation modes for exchange of data between said remote and mobile units, and an interface coupling the mobile unit to a vehicle application controller, the method comprising the steps of:

step for selecting the selected modulation mode from among the plurality of modulation modes;

transmitting from the remote unit to the mobile unit a representation of a particular user-selected vehicle application function using the selected modulation mode;

receiving the representation of the particular user-selected vehicle application function at said mobile unit in said selected modulation mode; and sending through the interface a command corresponding to the particular user-selected vehicle application function from the mobile unit to the vehicle application controller to cause the vehicle application controller to perform the user-selected vehicle application function.

18. A wireless remote control communications system comprising:

a first communication means for exchanging data in a plurality of modulation modes;

a second communication means for exchanging data in the plurality of modulation modes;

a first signal-processing means operatively coupled to the said first communication means, the first signal-processing means programmed to perform the following functions:

a) contain and transmit one or more user application function representations, each user application function representation representing a corresponding application function selectable by a user at a first device;

b) receive and analyse signals from the second communication means, the signals from the second communication means being indicative of criteria for modulation selection for communications between the first communication means and the second communication means;

c) receive and indicate one or more application functions originating from a second signal-processing means; and d) select a first selected modulation mode from among the plurality of modulation modes based on the criteria for modulation selection, the first selected modulation mode being for communications from the second communication means to the first communication means;

the second signal-processing means, wherein the second signal-processing means is operatively coupled to the second communications means and interfaced with an application controller, the second signal-processing means programmed to perform the following functions:

a) contain and transmit the one or more application functions originating from the second signal-processing means;

b) receive and analyse signals from the first communication means, the signals from the first communication means being indicative of criteria for modulation selection for communications between the first communication means and the second communication means;

c) receive at least one of the user application function representations and implement the function corresponding to the at least one of the user application function representations by sending a command signal to the application controller, the command signal corresponding to the at least one of the user application function representations; and d) select a second selected modulation mode from among the plurality of modulation modes based on the criteria for modulation selection, the second selected modulation mode being for communications from the first communication means to the second communication means.

19. A wireless remote control unit of a security system, the wireless remote control unit comprising:

a remote wireless transceiver; and remote baseband processor circuitry coupled to the remote wireless transceiver;

wherein:

the remote wireless transceiver is configured to communicate bidirectionally with a mobile unit of the security system using any modulation mode of a plurality of modulation modes, the plurality of modulation modes comprising a first modulation mode and a second modulation mode, the second modulation mode being different from the first modulation mode; and the remote baseband processor circuitry is configured to perform steps comprising:

transmitting from the remote unit to the mobile unit first frames using the first modulation mode, the first frames comprising a representation of a command to be carried out by the security system;

after transmitting the first frames, attempting to detect first feedback from the mobile unit, the first feedback being responsive to the first frames;

if the step of attempting to detect the first feedback detects the first feedback, indicating to a user that the command has been carried out;

if the step of attempting to detect the first feedback does not detect the first feedback, transmitting from the remote unit to the mobile unit second frames using the second modulation mode, the second frames including the representation of the command;

after transmitting the second frames, attempting to detect second feedback from the mobile unit, the second feedback being responsive to the second frames;

if the step of attempting to detect the second feedback does not detect the second feedback, indicating to the user of the security system that a mobile unit of the security system is out of range; and if the step of attempting to detect the second feedback detects the second feedback, indicating to the user that the command has been carried out.

20. A wireless mobile unit of a security system, the wireless mobile unit comprising:

a mobile wireless transceiver; and mobile baseband processor circuitry coupled to the mobile wireless transceiver;

wherein:

the mobile wireless transceiver is configured to communicate bidirectionally with a remote control unit of the security system using any modulation mode of a plurality of modulation modes, the plurality of modulation modes comprising a first modulation mode and a second modulation mode, the second modulation mode being different from the first modulation mode; and the mobile baseband processor circuitry is configured to perform steps comprising:

scanning alternately using the first modulation mode and the second modulation mode to receive one or more frames from the remote control unit, the one or more frames comprising a representation of a command to be carried out by the security system;

in response to receiving the one or more frames using the first modulation mode, causing the command to be executed and sending a first feedback to the remote control unit using the first modulation mode, the first feedback indicating that the command has been executed; and in response to receiving the one or more frames using the second modulation mode, causing the command to be executed and sending a second feedback to the remote control unit using the second modulation mode, the second feedback indicating that the command has been executed.

21. A wireless mobile unit of a security system, the wireless mobile unit comprising:

a mobile wireless transceiver;

received signal strength indicator (RSSI) circuitry; and mobile baseband processor circuitry coupled to the mobile wireless transceiver and to the RSSI circuitry;

wherein:

the mobile wireless transceiver is configured to communicate bidirectionally with a remote control unit of the security system using any modulation mode of a plurality of modulation modes, the plurality of modulation modes comprising a first modulation mode and a second modulation mode, the second modulation mode being different from the first modulation mode;

the RSSI circuitry is configured to provide indications of strength of signals received by the mobile wireless transceiver using each modulation mode of the plurality of modulation modes;

the mobile baseband processor circuitry is configured to perform steps comprising:

scanning using the first modulation mode and the second modulation mode to receive signals comprising a mode synchronization request command from the remote control unit;

sending feedback to the remote control unit, the feedback comprising a request for using a first selected modulation mode for communications from the remote control unit to the mobile unit, the first selected modulation mode being the first modulation mode if strength of the signals using the first modulation mode is greater than strength of the signals using the second modulation mode, the first selected modulation mode being the second modulation mode if strength of the signals using the second modulation mode is greater than strength of the signals using the first modulation mode;

after sending the feedback, scanning for a first mode confirmation message from the remote control unit, the first mode confirmation message confirming that the communications from the remote control unit to the mobile unit will be sent using the first selected modulation mode;

receiving a notification from the remote control unit, the notification comprising a second selected modulation mode for communications from the mobile unit to the remote control unit, the second selected modulation mode being based on strength of signals from the mobile unit to the remote control unit using the first modulation mode and the second modulation mode;

adjusting reception of the transceiver to the first selected modulation mode; and adjusting transmission of the transceiver to the second modulation mode.

22. The wireless mobile unit of claim 21, wherein the first selected modulation mode is different from the second selected modulation mode.

23. A wireless remote control unit of a security system, the wireless remote control unit comprising:

a remote wireless transceiver;

received signal strength indicator (RSSI) circuitry; and remote baseband processor circuitry coupled to the remote wireless transceiver and to the RSSI circuitry;

wherein:

the remote wireless transceiver is configured to communicate bidirectionally with a mobile unit of the security system using any modulation mode of a plurality of modulation modes, the plurality of modulation modes comprising a first modulation mode and a second modulation mode, the second modulation mode being different from the first modulation mode;

the RSSI circuitry is configured to provide indications of strength of signals received by the remote wireless transceiver using each modulation mode of the plurality of modulation modes;

the remote baseband processor circuitry is configured to perform steps comprising:

transmitting a mode synchronization request command to the mobile unit using the first modulation mode and the second modulation mode;

scanning using the first modulation mode and the second modulation mode to receive feedback from the mobile unit, the feedback comprising a request for using a first selected modulation mode for communications from the remote control unit to the mobile unit, the first selected modulation mode being selected based on strength of the mode synchronization command received by the mobile unit using the first modulation mode and the second modulation mode;

after receiving the feedback, transmitting to the mobile unit a first mode confirmation message, the first mode confirmation message confirming that the communications from the remote control unit to the mobile unit will be sent using the first selected modulation mode;

sending a notification to the mobile unit, the notification comprising a second selected modulation mode for communications from the mobile unit to the remote control unit, the second selected modulation mode being based on strength of signals from the mobile unit to the remote control unit using the first modulation mode and the second modulation mode;

adjusting transmission of the transceiver to the first selected modulation mode; and adjusting reception of the transceiver to the second modulation mode.

24. The wireless remote control unit of claim 23, wherein the first selected modulation mode is different from the second selected modulation mode.

* * * * *